(12) United States Patent
Honda et al.

(10) Patent No.: US 8,394,332 B2
(45) Date of Patent: Mar. 12, 2013

(54) EXHAUST GAS PURIFICATION APPARATUS

(75) Inventors: Koutarou Honda, Saitama (JP);
Masahito Nosaki, Saitama (JP);
Hiroyuki Kurita, Saitama (JP)

(73) Assignee: UD Trucks Corporation, Saitama (JP)

( * ) Notice: Subject to any disclaimer, the term of this patent is extended or adjusted under 35 U.S.C. 154(b) by 0 days.

(21) Appl. No.: 12/731,736

(22) Filed: Mar. 25, 2010

(65) Prior Publication Data

US 2010/0178216 A1 Jul. 15, 2010

Related U.S. Application Data

(63) Continuation of application No. PCT/JP2008/057816, filed on Apr. 23, 2008.

(30) Foreign Application Priority Data

Sep. 28, 2007 (JP) .................. 2007-254490

(51) Int. Cl.
*B01D 50/00* (2006.01)
(52) U.S. Cl. ........................................ 422/171
(58) Field of Classification Search ............. 422/177, 422/180
See application file for complete search history.

(56) References Cited

U.S. PATENT DOCUMENTS

| | | | |
|---|---|---|---|
| 2003/0221424 A1* | 12/2003 | Woerner et al. ................ | 60/297 |
| 2006/0156712 A1* | 7/2006 | Buhmann et al. .............. | 60/297 |
| 2006/0254258 A1* | 11/2006 | Blakeman et al. ............. | 60/286 |
| 2007/0175208 A1* | 8/2007 | Bandl-Konrad et al. ....... | 60/286 |
| 2007/0277507 A1* | 12/2007 | Yan ................................. | 60/286 |
| 2008/0264048 A1* | 10/2008 | Nishiyama et al. ............ | 60/299 |

FOREIGN PATENT DOCUMENTS

| | | |
|---|---|---|
| EP | 2119885 A1 * | 11/2009 |
| JP | 2004-108221 | 4/2004 |
| JP | 2005-155404 | 6/2005 |
| JP | 2007-040224 | 2/2007 |
| WO | WO 2008102561 A1 * | 8/2008 |

OTHER PUBLICATIONS

Chinese Patent Office Communication dated Nov. 24, 2011 in Appln. No. 200880109161.7.
Chinese Patent Office Communication mailed Aug. 29, 2012 in Appln. No. 200880109161.7.

* cited by examiner

*Primary Examiner* — Tom Duong
(74) *Attorney, Agent, or Firm* — Baker & Hostetler LLP

(57) ABSTRACT

An exhaust gas purification apparatus in which layout restriction is lessened to be able to further achieve space-saving is proposed. The exhaust gas purification apparatus includes a first cylindrical housing in which an oxidation catalytic converter and a PM collection filter are contained and a second cylindrical housing in which a reducing catalytic converter and an ammonia oxidation catalytic converter are contained. The exhaust gas purification apparatus further includes a communicating pipe that connects between far end portions of both the housings, and a nozzle that is disposed in the communicating pipe and injects liquid reducing agent in exhaust gas. The two housings are closely disposed such that axis lines thereof are arranged substantially parallel. The communicating pipe is disposed such that an axis line thereof is arranged substantially parallel with the axis lines of the housings. A flow passage of the exhaust gas from the first housing to the second housing is folded by the communicating pipe.

8 Claims, 3 Drawing Sheets

EXHAUST GAS PURIFICATION APPARATUS

CROSS-REFERENCE TO RELATED APPLICATIONS

This application is a Continuation of International Patent Application No. PCT/J2008/057816, filed on Apr. 23, 2008, which claims priority to foreign Patent Application No. JP 2007-254490, filed on Sep. 28, 2007.

FIELD OF THE INVENTION

The present invention relates to an exhaust gas purification apparatus for an engine, particularly to an SCR (Selective Catalytic Reduction) type exhaust gas purification apparatus including a Particulate Matter (PM) collection filter.

BACKGROUND OF THE INVENTION

Recently, the SCR type exhaust gas purification apparatus is proposed as the exhaust gas purification apparatus that removes nitrogen oxide (NOx) contained in the exhaust gas of the engine. A reducing catalytic converter included in the exhaust gas purification apparatus is provided in an exhaust gas system, and a reducing agent is injected from a nozzle to the exhaust gas on an upstream side of the reducing catalytic converter, to subject a catalytic reduction reaction of NOx in the exhaust gas and the reducing agent to thereby perform a purification treatment of NOx to a harmless component. Because ammonia having good reactivity with NOx is adopted in the reduction reaction, a urea aqueous solution, an ammonia aqueous solution, or an HC liquid reducing agent (referred to as liquid reducing agent while a precursor thereof is included) is adopted as the reducing agent. The urea aqueous solution and the ammonia aqueous solution are hydrolyzed with exhaust gas heat and water vapor in the exhaust gas to easily generate ammonia.

Recently, the SCR type exhaust gas purification apparatus having the PM collecting function in addition to the NOx removing function is also achieved in accordance with tightening of emission gas regulation. In such cases, it is necessary to further arrange the PM collecting filter to the exhaust gas system in which the reducing catalytic converter and the nozzle which injects the liquid reducing agent into the exhaust gas at the upstream side of the reducing catalytic converter are disposed. Thus, it is requested to achieve space-saving by devising a layout in which the PM collecting filter is further arranged in addition to the nozzle and the reducing catalytic converter. For example, there has been proposed an exhaust gas purification apparatus described in Japanese Laid-Open (kokai) Patent Application Publication No. 2007-040224 (Patent literature 1).

The exhaust gas purification apparatus disclosed in Patent literature 1 includes a first housing in which an oxidation catalytic converter for oxidizing nitrogen monoxide in exhaust gas and the PM collecting filter are contained, and a second housing in which the reducing catalytic converter and an ammonia oxidation catalytic converter for oxidizing excess ammonia are contained, in which the nozzle that injects the liquid reducing agent is provided in a pipe that connects the first housing and the second housing. The first housing and the second housing are disposed while sandwiching a chassis frame therebetween (that is, the first housing and the second housing are transversely disposed), which allows for compact layout of the exhaust gas purification apparatus in a front-back direction of a vehicle (paragraph [0006], [0007], and [0009] of Patent literature 1).

In the exhaust gas purification apparatus disclosed in Patent literature 1, in order to evenly diffuse the liquid reducing agent in the exhaust gas, it is necessary that the pipe between the housings have a certain length. Therefore, the pipe is provided so as to transverse the chassis frame (paragraph [0010] of Patent literature 1). That is, in the exhaust gas purification apparatus, the need for securing the length of the pipe arises in order to evenly diffuse the liquid reducing agent, and therefore, the miniaturization is hardly achieved in the length direction from the upstream to the downstream of the exhaust gas flow, and the restriction that only the layout disclosed in Patent literature 1 can be made is imposed.

SUMMARY OF THE INVENTION

In view of the foregoing, the invention proposes an exhaust gas purification apparatus in which the restriction of the layout is lessened to be able to further achieve the space-saving.

An exhaust gas purification apparatus proposed herein, in order to solve the problem mentioned above, includes: a first cylindrical housing in which at least a filter for collecting a particulate matter in exhaust gas is contained; a second cylindrical housing in which at least a reducing catalytic converter for reduction-purifying nitrogen oxide with a liquid reducing agent is contained; a communicating pipe that connects between far end portions of the each housing; and a nozzle that is disposed in the communicating pipe and injects liquid reducing agent into the exhaust gas, in which: the first and second cylindrical housings are closely disposed such that axis lines thereof are arranged substantially parallel to each other; and the communicating pipe is disposed such that an axis line thereof is arranged substantially parallel with the axis lines of the housings, thereby folding a flow passage of the exhaust gas from the first housing to the second housing.

The first housing may contain an oxidation catalytic converter that oxidizes nitrogen monoxide in the exhaust gas to nitrogen dioxide on the upstream side of the PM collection filter. The second housing may contain an ammonia oxidation catalytic converter that oxidizes ammonia in the exhaust gas on the downstream side of the reducing catalytic converter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DETAILED DESCRIPTION

Figure 1:
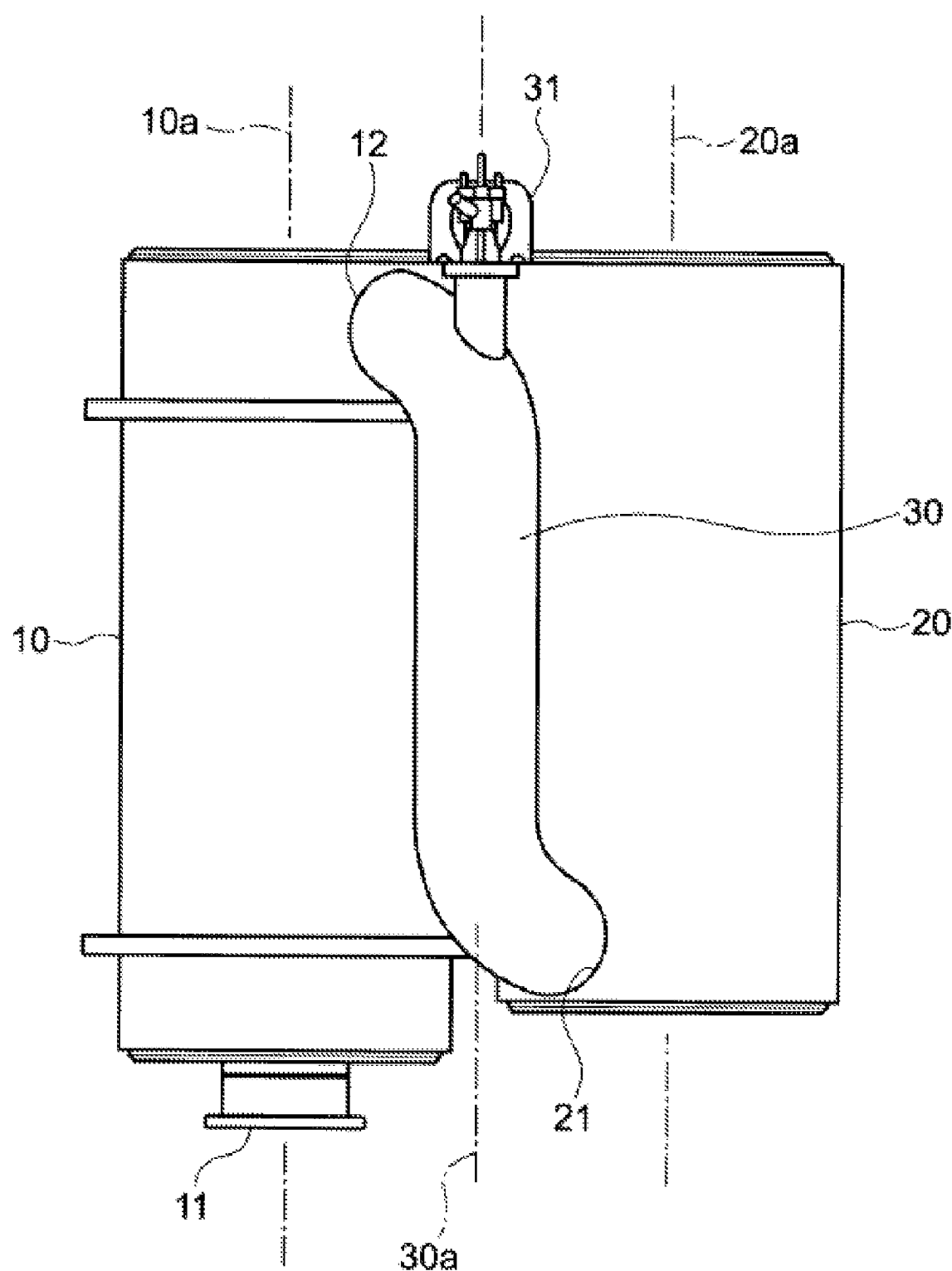
FIG. 1 is a plan view illustrating an embodiment of an exhaust gas purification apparatus.
Figure 2:
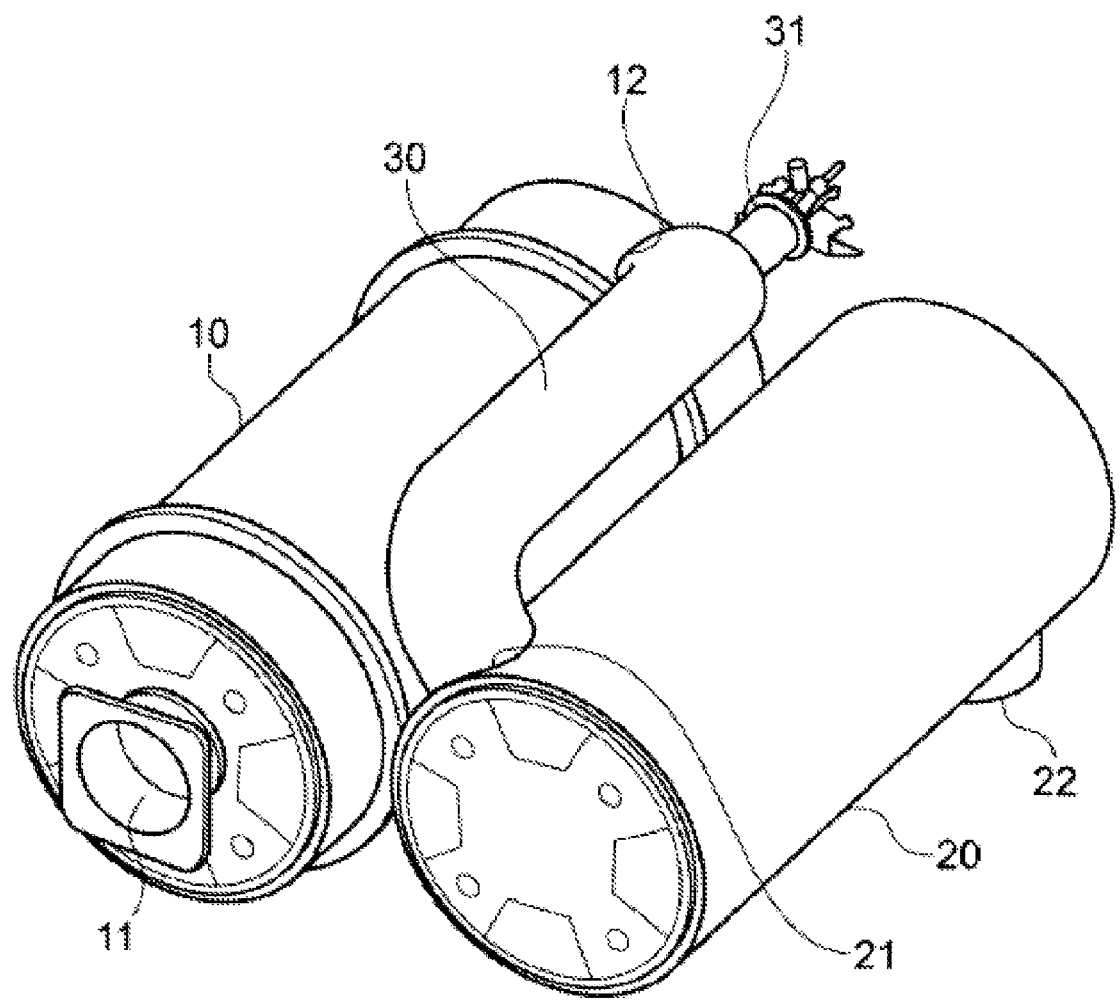
FIG. 2 is a perspective view illustrating the embodiment of the exhaust gas purification apparatus.
Figure 3:
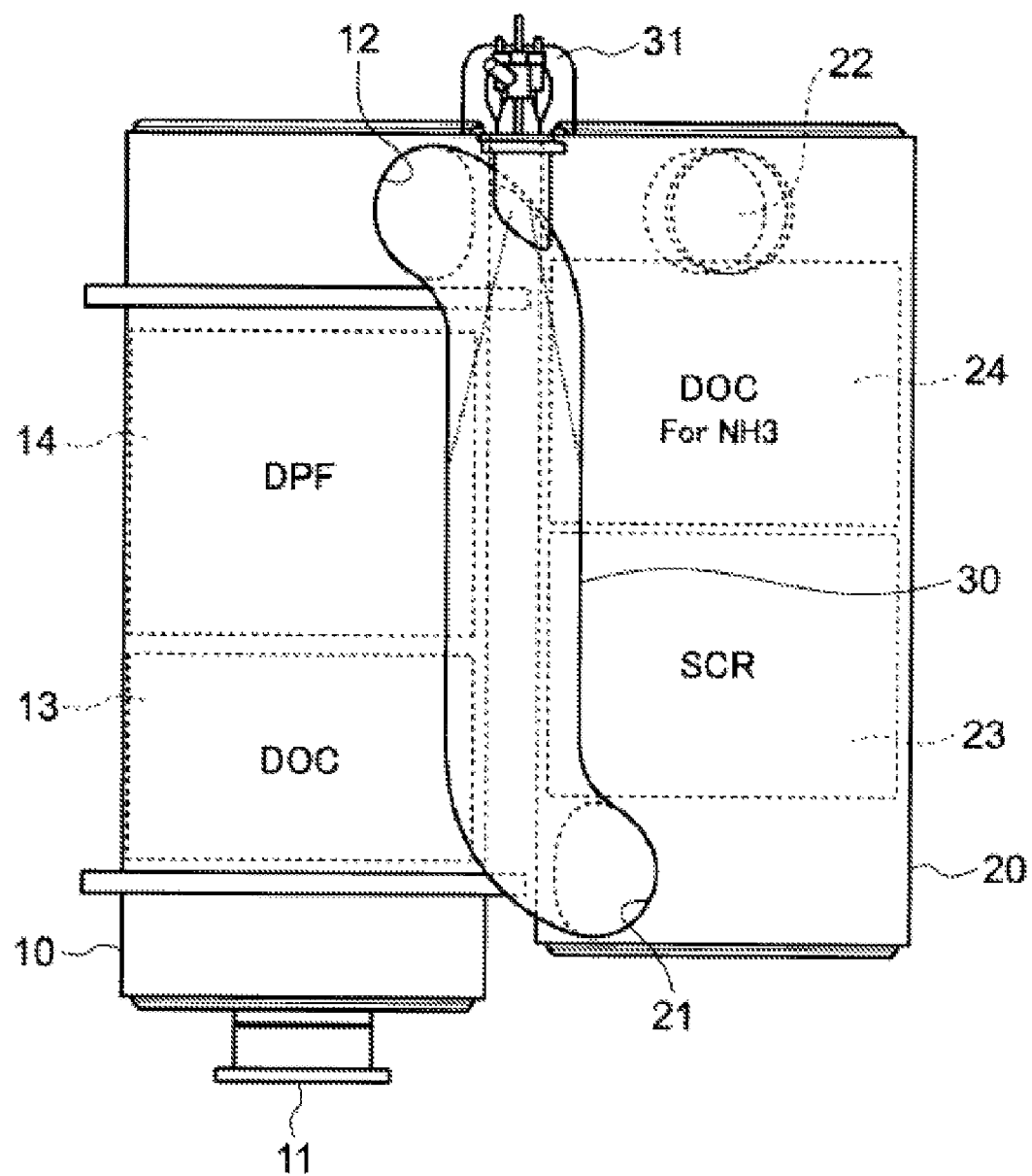
FIG. 3 is a perspective view illustrating the embodiment of an inside of the exhaust gas purification apparatus.

FIGS. 1 to 3 illustrate an embodiment of an exhaust gas purification apparatus. This exhaust gas purification apparatus is provided in, for example, an exhaust gas system of a diesel engine, and the exhaust gas purification apparatus includes both the SCR and the PM collection filter as described above.

The exhaust gas purification apparatus includes a first cylindrical housing 10, a second cylindrical housing 20, and a communicating pipe 30 that connects between far end portions of the housings 10 and 20. The first housing 10 and the second housing 20 are closely disposed such that an axis line 10a and an axis line 20a thereof are arranged substantially parallel to each other (a parallel level to the sight). The communicating pipe 30 is disposed such that an axis line 30a thereof is arranged substantially parallel with the axis lines 10a and 20a of the housings 10 and 20 (a parallel level to the sight).

In the first housing 10, an inflow port 11 is formed in an end portion on an upstream side of the exhaust gas flow, and a discharge port 12 is formed in an end portion on a downstream side of the exhaust gas flow. In the embodiment, the inflow port 11 is formed in an end face in the upstream side end portion, and the discharge port 12 is formed in a side face in the downstream side end portion. An oxidation catalytic converter 13 and a filter 14 are contained in series between the inflow port 11 and the discharge port 12. The oxidation catalytic converter 13 oxidizes nitrogen monoxide in the exhaust gas to nitrogen dioxide, the filter 14 collects PM in the exhaust gas, and the oxidation catalytic converter 13 is located on the upstream side of the filter 14 (FIG. 3).

In the second housing 20, an inflow port 21 is formed in an end portion on an upstream side of the exhaust gas flow, and a discharge port 22 is formed in an end portion on a downstream side of the exhaust gas flow. In the embodiment, both the inflow port 21 and the discharge port 22 are formed in side faces in the upstream and downstream end portions. A reducing catalytic converter 23 and an ammonia oxidation catalytic converter 24 are contained in series between the inflow port 21 and the discharge port 22. The reducing catalytic converter 23 reduction-purifies nitrogen oxide with liquid reducing agent, the ammonia oxidation catalytic converter 24 oxidizes ammonia in the exhaust gas, and the reducing catalytic converter 23 is located on the upstream side of the ammonia oxidation catalytic converter 24 (FIG. 3).

The communicating pipe 30 connects between far end portions of the housings 10 and 20, that is, the discharge port 12 in the downstream side end portion of the first housing 10 and the inflow port 21 in the upstream side end portion of the second housing 20. The discharge port 12 and the inflow port 21 are formed in end portions located on the opposite sides of the housings 10 and 20 away from each other (namely, far end portions). Accordingly, the engine exhaust gas flows from the inflow port 11 into the first housing 10, and the exhaust gas passing through the oxidation catalytic converter 13 and the filter 14 enters the communicating pipe 30 via the discharge port 12. Then the exhaust gas passing through the communicating pipe 30 flows from the inflow port 21 into the second housing 20, and the exhaust gas passing through the reducing catalytic converter 23 and the ammonia oxidation catalytic converter 24 is discharged from the discharge port 22. That is, the flow passage of the exhaust gas from the first housing 10 through the communicating pipe 30 to the second housing 20 is folded once by the communicating pipe 30.

The communicating pipe 30 is the straight pipe in which bent portions are formed at both ends thereof in order to be engaged to the discharge port 12 and the inflow port 21. In the bent portion for the discharge port 12, a nozzle 31 is provided, and the nozzle 31 injects the liquid reducing agent toward the inside of the straight pipe portion (dotted line in FIG. 3). Therefore, a straight-line length enough to evenly diffuse the liquid reducing agent in the exhaust gas is secured. In the communicating pipe 30, a mesh diffuser plate may be placed in order to assist the even diffusion.

According to the above-mentioned embodiment, the two housings 10 and 20 are closely disposed in parallel, and a silhouette (projection area) of the housings 10 and 20 is made a compact size corresponding to a square muffler. Further, the far end portions of the two housings 10 and 20 are connected by the communicating pipe 30. Therefore, the communicating pipe 30 is accommodated in the silhouette of the two housings 10 and 20 while the length enough to evenly diffuse the liquid reducing agent is obtained, and hence, the size can be reduced in the length direction from the upstream to the downstream of the exhaust gas flow.

In the above-mentioned embodiment, the cylindrical housing having the circular section is adopted as the first and second housings 10 and 20. Alternatively, the cylindrical housing having the polygonal section may be used as the first and second housings 10 and 20. Alternatively, an inside of one box may be partitioned into a first channel and a second channel, thereby closely disposing the two housings in parallel.

In the exhaust purification apparatus according to the aspect of the invention, the far end portions (that is, end portions located on the opposite sides away from each other) of the two cylindrical housings disposed in parallel are connected through the communicating pipe, which allows the long length of the communicating pipe to be secured. Accordingly, the pipe length enough to evenly diffuse the liquid reducing agent can be obtained when the nozzle for the liquid reducing agent is disposed at an end of the communicating pipe. The flow passage of the exhaust gas is folded by the structure in which the two cylindrical housings are disposed in parallel while the communicating pipe that connects the far end portions of the two cylindrical housings is disposed. Therefore, the size can be reduced in the length direction from the upstream to the downstream of the exhaust gas flow, and it is unnecessary to make the layout of the pipe that strides across the chassis frame as is conventionally done.

Consequently, in the exhaust purification apparatus according to the aspect of the invention, the compact size equivalent to a square muffler in which the communicating pipe is accommodated in the silhouette (projection area) of two substantially parallel housings can be achieved while the length enough to evenly diffuse the liquid reducing agent is obtained in the communicating pipe, and the space-saving can be achieved without imposing the conventional layout restriction.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:
1. An exhaust gas purification apparatus, comprising:
a first cylindrical housing in which at least a filter for collecting particulate matter in exhaust gas is contained;
a second cylindrical housing in which at least a reducing catalytic converter for reduction-purifying nitrogen oxide with liquid reducing agent is contained;
a communicating pipe, including a straight portion, connecting opposite end portions of each housing; and
a nozzle, attached to the communicating pipe, to inject liquid reducing agent into the straight portion, wherein the first and second cylindrical housings are closely disposed such that axis lines thereof are arranged substantially parallel to each other, wherein the communicating pipe is disposed such that an axis line thereof is arranged substantially parallel with the axis lines of the housings, thereby folding a flow passage of the exhaust gas from the first housing to the second housing, and wherein the straight portion of the communicating pipe is located between the two cylindrical housings and disposed such that a projection of the straight portion of the communicating pipe overlaps a projection of the two cylindrical housings as viewed from a direction perpendicular to a plane including the axis lines of the two cylindrical housings.

2. The exhaust gas purification apparatus according to claim 1, wherein the first housing further contains an oxidation catalytic converter that oxidizes nitrogen monoxide in the exhaust gas to nitrogen dioxide on an exhaust upstream side of the filter.

3. The exhaust gas purification apparatus according to claim 1, wherein the second housing further contains an ammonia oxidation catalytic converter that oxidizes ammonia in the exhaust gas on an exhaust downstream side of the reducing catalytic converter.

4. The exhaust gas purification apparatus according to claim 1, wherein an overall width of the exhaust gas purification apparatus is less than the sum of:
  a width of the straight portion of the communicating pipe measured transverse to an axis of the straight portion of the communicating pipe,
  a width of the first cylindrical housing measured transverse to the axis of the first cylindrical housing, and
  a width of the second cylindrical housing measured transverse to the axis of the second cylindrical housing,
  wherein the overall width of the exhaust gas purification apparatus is measured in a plane containing the axis of the first cylindrical housing and the axis of the second cylindrical housing, and
  wherein the overall width of the exhaust gas purification apparatus is measured transverse to the axis of the first cylindrical housing.

5. An exhaust gas purification apparatus, comprising:
  a first cylindrical housing in which at least a filter for collecting particulate matter in exhaust gas is contained;
  a second cylindrical housing in which at least a reducing catalytic converter for reduction-purifying nitrogen oxide with liquid reducing agent is contained;
  a communicating pipe connecting opposite end portions of each housing such that the communicating pipe connects between a discharge port formed in a side face in a downstream side end portion of the first cylindrical housing and an inflow port formed in a side face in an upstream side end portion of the second cylindrical housing; and
  a nozzle, attached to the communicating pipe, to inject a liquid reducing agent into the exhaust gas,
  wherein the first and second cylindrical housings are closely disposed such that axis lines thereof are arranged substantially parallel to each other,
  wherein the communicating pipe comprises a straight portion and bent portions formed at both ends of the straight portion in order to be engaged to the discharge port and the inflow port, and is disposed such that an axis line of the straight portion is arranged substantially parallel with the axis lines of the housings, thereby changing a flow direction of the exhaust gas from the first housing to the second housing,
  wherein the straight portion of the communicating pipe is located between the two cylindrical housings and disposed such that a projection of the straight portion of the communicating pipe overlaps a projection of the two cylindrical housings as viewed from a direction perpendicular to a plane including the axis lines of the two cylindrical housings, and wherein the nozzle is attached to a bent portion for the discharge port and injects the liquid reducing agent toward an inside of the straight portion.

6. The exhaust gas purification apparatus according to claim 5, wherein the first housing further contains an oxidation catalytic converter that oxidizes nitrogen monoxide in the exhaust gas to nitrogen dioxide on an exhaust upstream side of the filter.

7. The exhaust gas purification apparatus according to claim 5, wherein the second housing further contains an ammonia oxidation catalytic converter that oxidizes ammonia in the exhaust gas on an exhaust downstream side of the reducing catalytic converter.

8. The exhaust gas purification apparatus according to claim 5, wherein an overall width of the exhaust gas purification apparatus is less than the sum of:
  a width of the straight portion of the communicating pipe measured transverse to an axis of the straight portion of the communicating pipe,
  a width of the first cylindrical housing measured transverse to the axis of the first cylindrical housing, and
  a width of the second cylindrical housing measured transverse to the axis of the second cylindrical housing,
  wherein the overall width of the exhaust gas purification apparatus is measured in a plane containing the axis of the first cylindrical housing and the axis of the second cylindrical housing, and
  wherein the overall width of the exhaust gas purification apparatus is measured transverse to the axis of the first cylindrical housing.

* * * * *